US012564994B2

(12) United States Patent
Mireles et al.

(10) Patent No.: US 12,564,994 B2
(45) Date of Patent: Mar. 3, 2026

(54) THERMOFORMING PROCESS WITH A REFORMABLE MOLD

(71) Applicant: Ford Motor Company, Dearborn, MI (US)

(72) Inventors: Ricardo Mireles, Huixquilucan (MX); Daniel Ortega, Mexico City (MX); Rodrigo Gallego, Mexico City (MX); Emilio Ruiz, Toluca (MX)

(73) Assignee: Ford Motor Company, Dearborn, MI (US)

( * ) Notice: Subject to any disclaimer, the term of this patent is extended or adjusted under 35 U.S.C. 154(b) by 202 days.

(21) Appl. No.: 18/340,364

(22) Filed: Jun. 23, 2023

(65) Prior Publication Data

US 2024/0424725 A1     Dec. 26, 2024

(51) Int. Cl.
| | |
|---|---|
| *B29C 51/08* | (2006.01) |
| *B29C 51/20* | (2006.01) |
| *B29C 51/38* | (2006.01) |
| *B29C 51/42* | (2006.01) |
| *B33Y 80/00* | (2015.01) |

(52) U.S. Cl.
CPC ............ *B29C 51/087* (2013.01); *B29C 51/20* (2013.01); *B29C 51/38* (2013.01); *B29C 51/421* (2013.01); *B33Y 80/00* (2014.12)

(58) Field of Classification Search
CPC ....... B29C 51/10; B29C 51/46; B29C 51/421; B29C 51/38; B29C 51/20; B29C 51/087; B33Y 80/00
See application file for complete search history.

(56) References Cited

U.S. PATENT DOCUMENTS

| | | | | |
|---|---|---|---|---|
| 3,381,068 | A | * | 4/1968 | Leiper .................... B29C 51/34 |
| | | | | 264/296 |
| 3,802,819 | A | * | 4/1974 | Alroy ..................... B29C 31/00 |
| | | | | 425/388 |
| 5,964,134 | A | * | 10/1999 | Arends ................... B26D 5/14 |
| | | | | 83/13 |
| 2007/0277575 | A1 | | 12/2007 | Pohler et al. |

FOREIGN PATENT DOCUMENTS

| | | |
|---|---|---|
| CN | 110198825 | 1/2022 |
| EP | 0995582 | 4/2000 |
| EP | 1854615 | 11/2007 |

OTHER PUBLICATIONS alibaba.com, Chaoxu ABS PC School Bag Airport Traveling Bag Production Line Plastic Thermoforming Machine YX-24A, Product pages, available at URL https://www.alibaba.com/product-detail/CHAOXU-ABS-PC-School-Bag-Airport_60588702117.html?fromMSite=true.

* cited by examiner

*Primary Examiner* — Monica A Huson
(74) *Attorney, Agent, or Firm* — Burris Law, PLLC

(57)     ABSTRACT

A thermoforming apparatus includes a mold with a plurality of sections. Each section is independently movable. The thermoforming apparatus further includes a set of electro-mechanical actuators. Each electromechanical actuator is attached to a screw that moves each section of the plurality of sections to specific positions. The mold is configured to press against a blank to form a product with a shape corresponding to the specific positions of the plurality of sections.

15 Claims, 8 Drawing Sheets

THERMOFORMING PROCESS WITH A REFORMABLE MOLD

FIELD

The present disclosure relates to a thermoforming process. More specifically, the present disclosure relates to a thermoforming process with a reformable mold.

BACKGROUND

The statements in this section merely provide background information related to the present disclosure and may not constitute prior art.

Thermoforming is a manufacturing process where a plastic sheet is heated to a pliable forming temperature. The sheet is formed to a specific shape in a mold and then trimmed to create a usable product. Specifically, the sheet is heated in an oven to a high-enough temperature that permits it to be stretched into or onto a mold and cooled to a finished shape. In some implementations, machines are utilized to heat and form the plastic sheet and trim in a continuous high-speed process and can produce many thousands of finished parts per hour depending on the machine and mold size and the size of the parts being formed. To form a sheet with a different shape, another mold with the desired shape is utilized.

Accordingly, exchanging molds with different shapes adds to the manufacturing cycle time.

These issues related to thermoforming of plastic sheets are addressed by the present disclosure.

SUMMARY

This section provides a general summary of the disclosure and is not a comprehensive disclosure of its full scope or all of its features.

In one form of the present disclosure, a thermoforming apparatus includes a mold with a plurality of sections. Each section is independently movable relative. The thermoforming apparatus further includes a set of electromechanical actuators. Each electromechanical actuator is attached to a screw that moves each section of the plurality of sections to specific positions. The mold is configured to press against a blank to form a product with a shape corresponding to the specific positions of the plurality of sections.

In variations of the thermoforming apparatus, which may be implemented individually or in any combination: the apparatus further includes a pneumatic actuator that moves the blank into a specified position; the pneumatic actuator moves the blank after the product is formed; the apparatus further includes a heater that heats the blank prior to forming the product; the set of electromechanical actuators is a set of stepper motors, each stepper motor being attached to a respective screw to transmit rotational movement to longitudinal movement; the apparatus further includes a lock mechanism that secures each section at the specific positions; after a first product is formed, each section is moved to a new position to form a second product; the apparatus further includes a controller that provides instructions to the set of electromechanical actuators and a computer that transmits instructions to the controller through an interface to position the set of electromechanical actuators based on a computer aided design (CAD) file loaded in the computer; and the controller is a programable logic controller (PLC).

In another form, a thermoforming assembly includes a first apparatus and a second apparatus, each apparatus including: a mold with a plurality of sections, each section being independently movable; and a set of electromechanical actuators, each electromechanical actuator being attached to a screw that moves each section of the plurality of sections to specific positions, the mold being configured to press against a blank to form a product with a shape corresponding to the specific positions of the plurality of sections. The mold of the first apparatus is pressed against a first side of the blank, and the mold of the second apparatus is pressed against a second side of the blank.

In variations of this assembly, which may be implemented individually or in any combination: the assembly further includes a pneumatic actuator that moves the blank into a specified position; the pneumatic actuator moves the blank after the product is formed; the assembly further includes a heater that heats the blank prior to forming the product; the set of electromechanical actuators is a set of stepper motors, each stepper motor being attached to a respective screw to transmit rotational movement to longitudinal movement; the assembly further includes a lock mechanism that secures each section at the specific positions; the assembly further includes a controller that provides instructions to the set of electromechanical actuators and a computer that transmits instructions to the controller through an interface to position the set of electromechanical actuators based on a computer aided design (CAD) file loaded in the computer.

In yet another form, a method of thermoforming includes moving a set of actuators to position each section of a plurality of sections, each section being independently movable to the other sections, the position of the plurality of sections defining a mold; positioning a blank; heating the blank; and forming a product from the blank with the mold.

In variations of this method, which may be implemented individually or in any combination: the product has a shape corresponding to specific positions of the plurality of sections; the method further includes positioning a 3D printed work surface, the plurality of sections being moved into a position corresponding to the 3D printed work surface, the product having a shape corresponding to the 3D printed work surface; and the 3D printed work surface is replaced with another 3D printed work surface.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
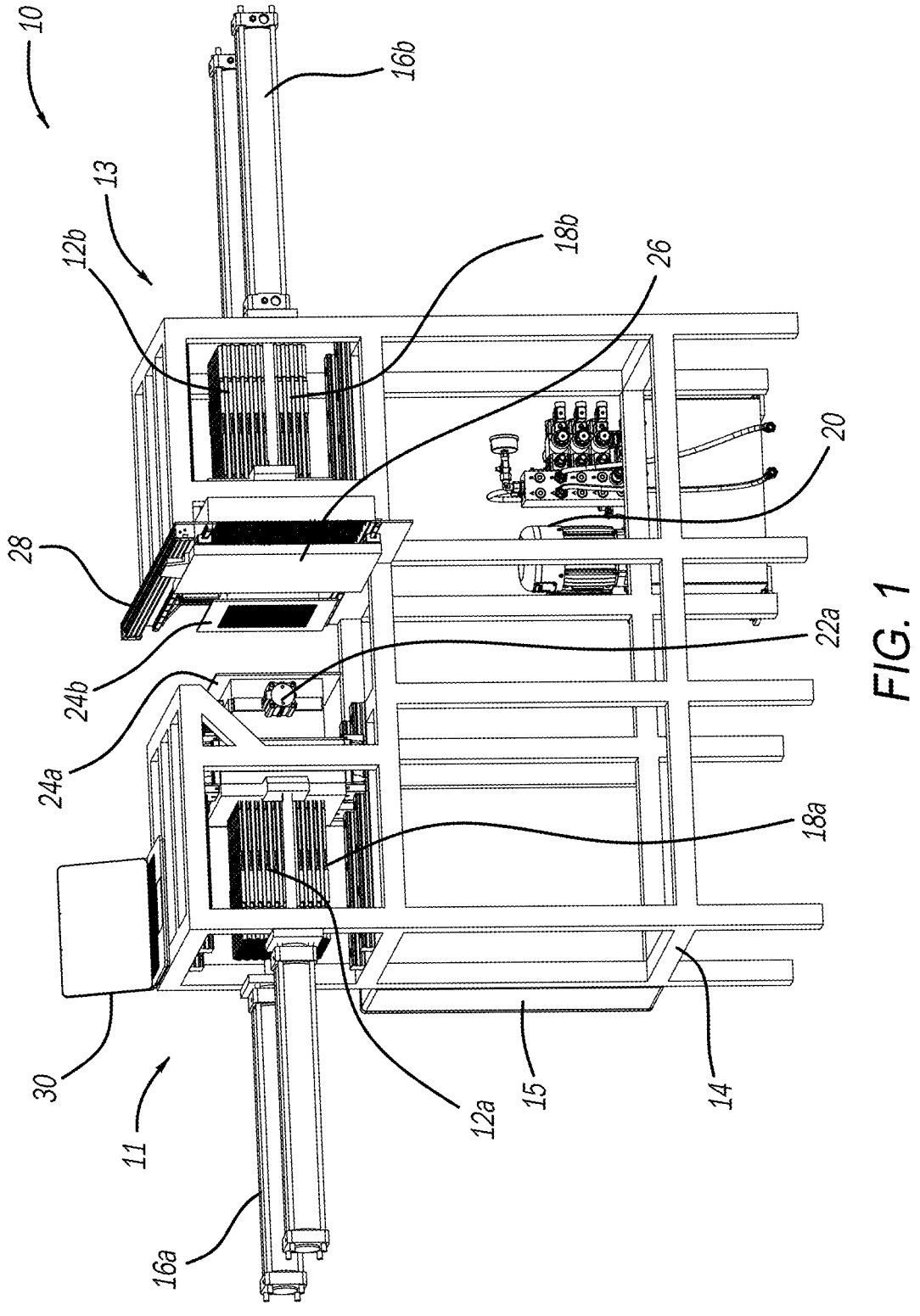
FIG. 1 shows a thermoforming assembly in accordance with the principles of the present disclosure.
Figure 2:
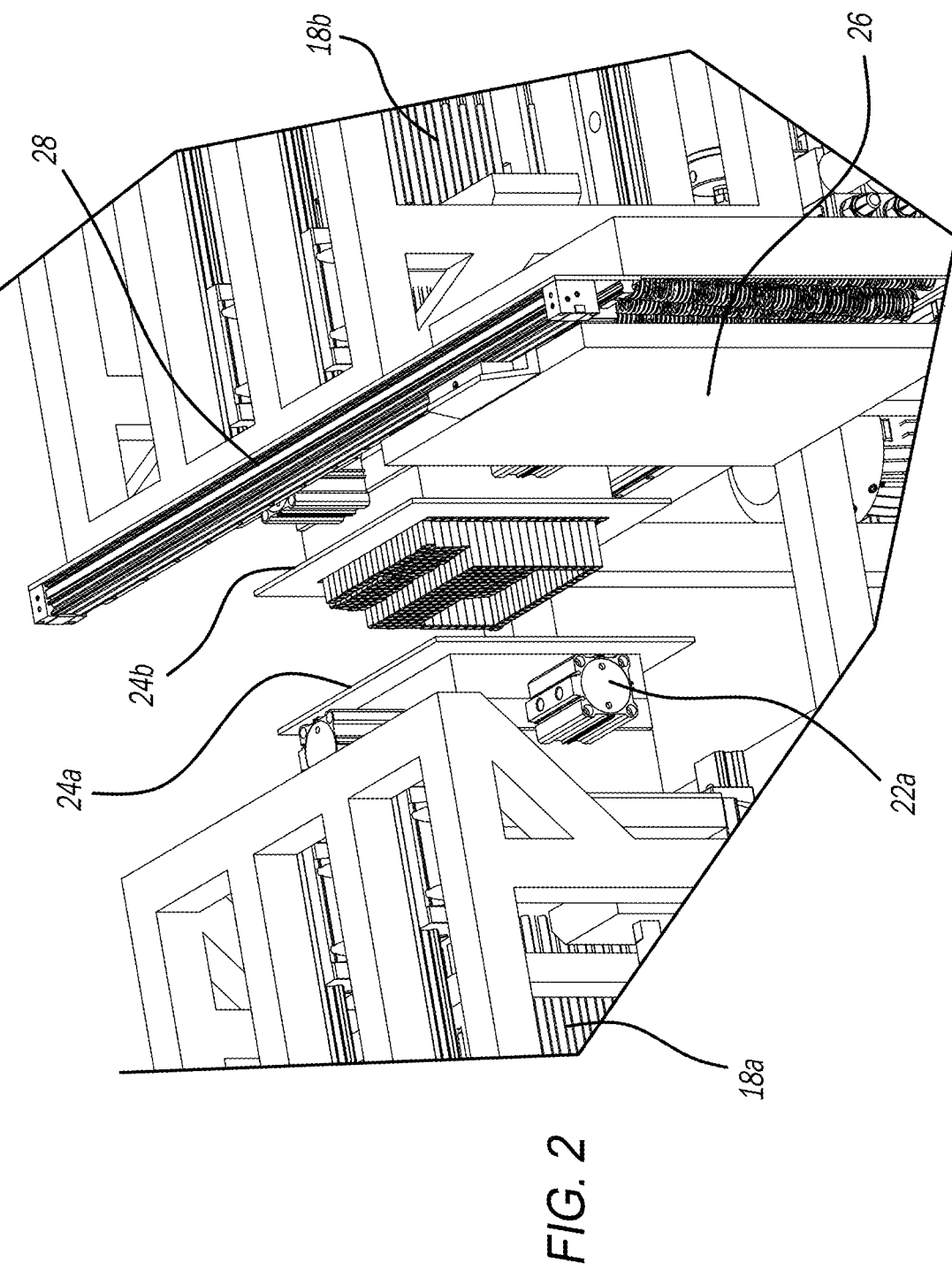
FIG. 2 shows a closeup view of the assembly shown in FIG. 1 in accordance with the principles of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure describes a thermoforming system and process where a mold can change its form to increase the flexibility of the process and reduce the time to utilize thermoforming molds of different shapes. Accordingly, a new mold shape is formed in minutes rather than hours. Moreover, the production of components with complex shapes can be achieved by adding 3D printing to obtain parts based on computer-aided drawings (CAD) in days instead of weeks.

Based on the understanding of thermoforming as described above, the inventors have discovered several design features to provide a reformable mold that is utilized in a thermoforming system.

Referring now to FIG. 1 there is shown a thermoforming assembly 10, which includes a first thermoforming apparatus 11 and a second thermoforming apparatus 13 attached to a frame 14. The thermoforming assembly 10 receives operating instructions from a controller 15. In some implementations, the controller 15 is a programmable logic controller (PLC). In certain implementations, the thermoforming assembly includes a computer 30, such as, for example, a laptop computer. The computer 30 provides an interface with an operator to send instructions to the controller 15.

Each apparatus 11, 13 includes, respectively, a set of electromechanical actuators 12a, 12b and a mold 24a, 24b. Each mold 24a, 24b has a plurality of sections with each section being independently movable relative to the other sections. In some implementations, each set of electromechanical actuators 12a, 12b are attached to a respective set of screws 18a, 18b that move each section of the plurality of sections to specific positions. In various implementations, each set of actuators 12a, 12b is set of stepper motors where each stepper motor is attached to a screw of the set of screws 18a, 18b. The combination of each screw with a corresponding stepper motor converts rotational movement of the stepper motor to longitudinal movement of the screws 18a, 18b.

The thermoforming assembly 10 further includes one or more rails 28 that enable movement of a plastic blank 26 between the molds 24a, 24b. In addition, associated with each apparatus 11, 13 are hydraulic cylinders 16a, 16b that move the molds 24a, 24b toward and away from each other. In some variations, the one or more rails 28 is a pneumatic unit such that the hydraulic cylinders 16a, 16b and the one or more rails 28 receive pressurized gas from a hydraulic unit 20.

Figure 3A:
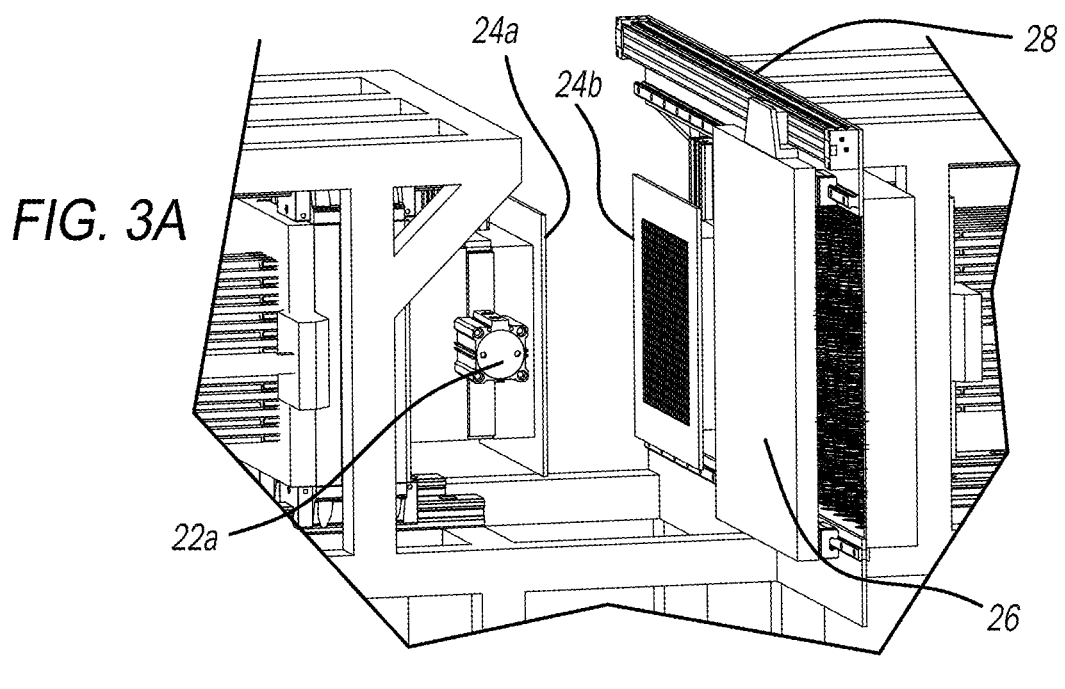
FIGS. 3A-3E shows a sequence of steps of forming a component with the thermoforming assembly shown in FIG. 1 in accordance with the principles of the present disclosure.
Figure 3B:
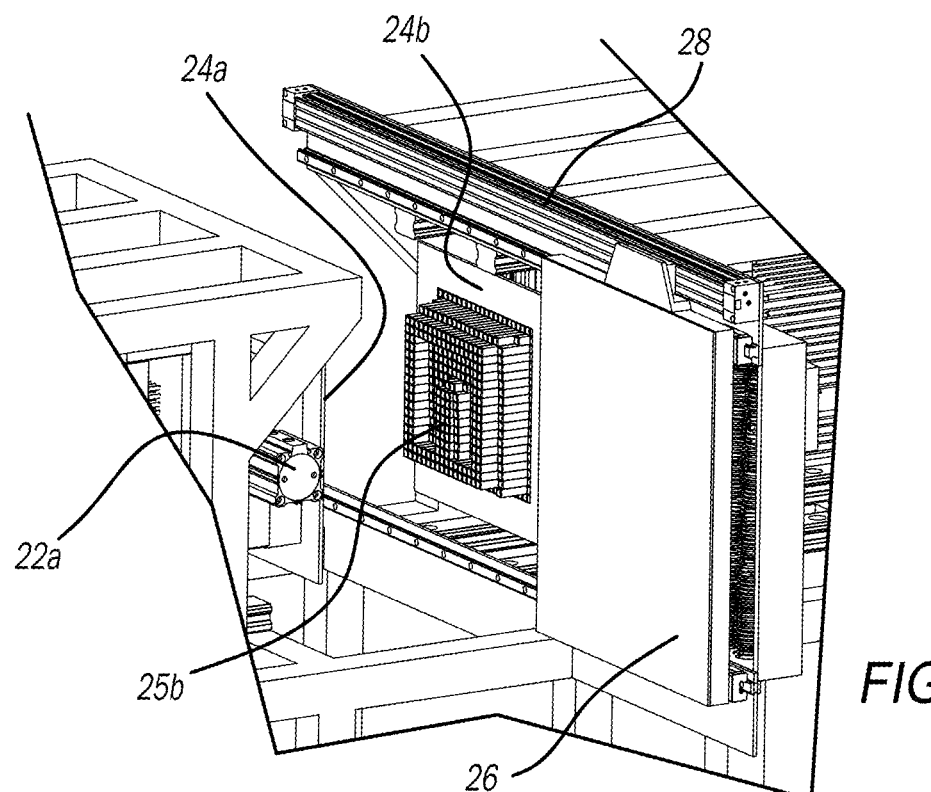
Figures 3C, 3D:
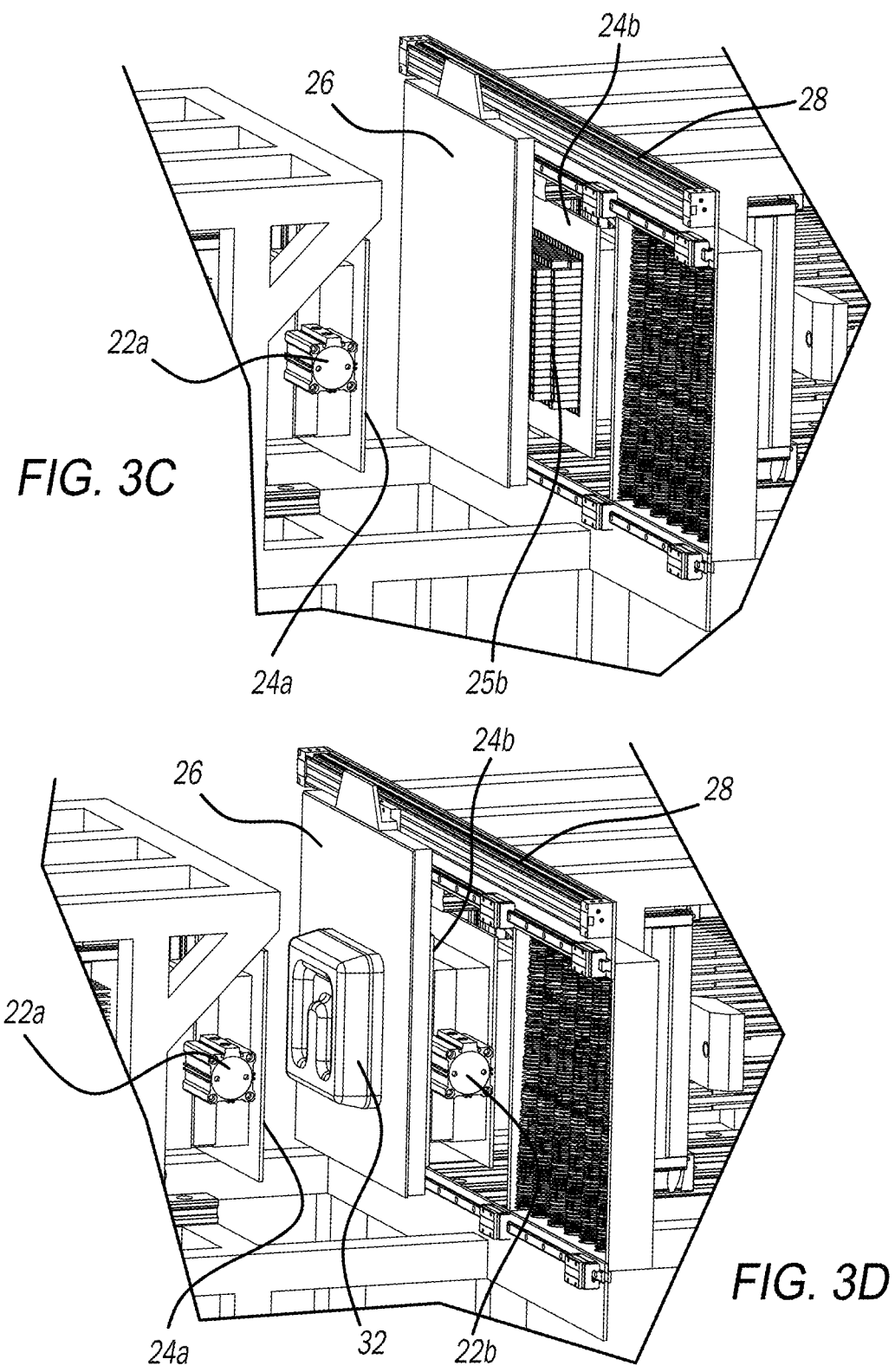
Figures 3E, 4A:
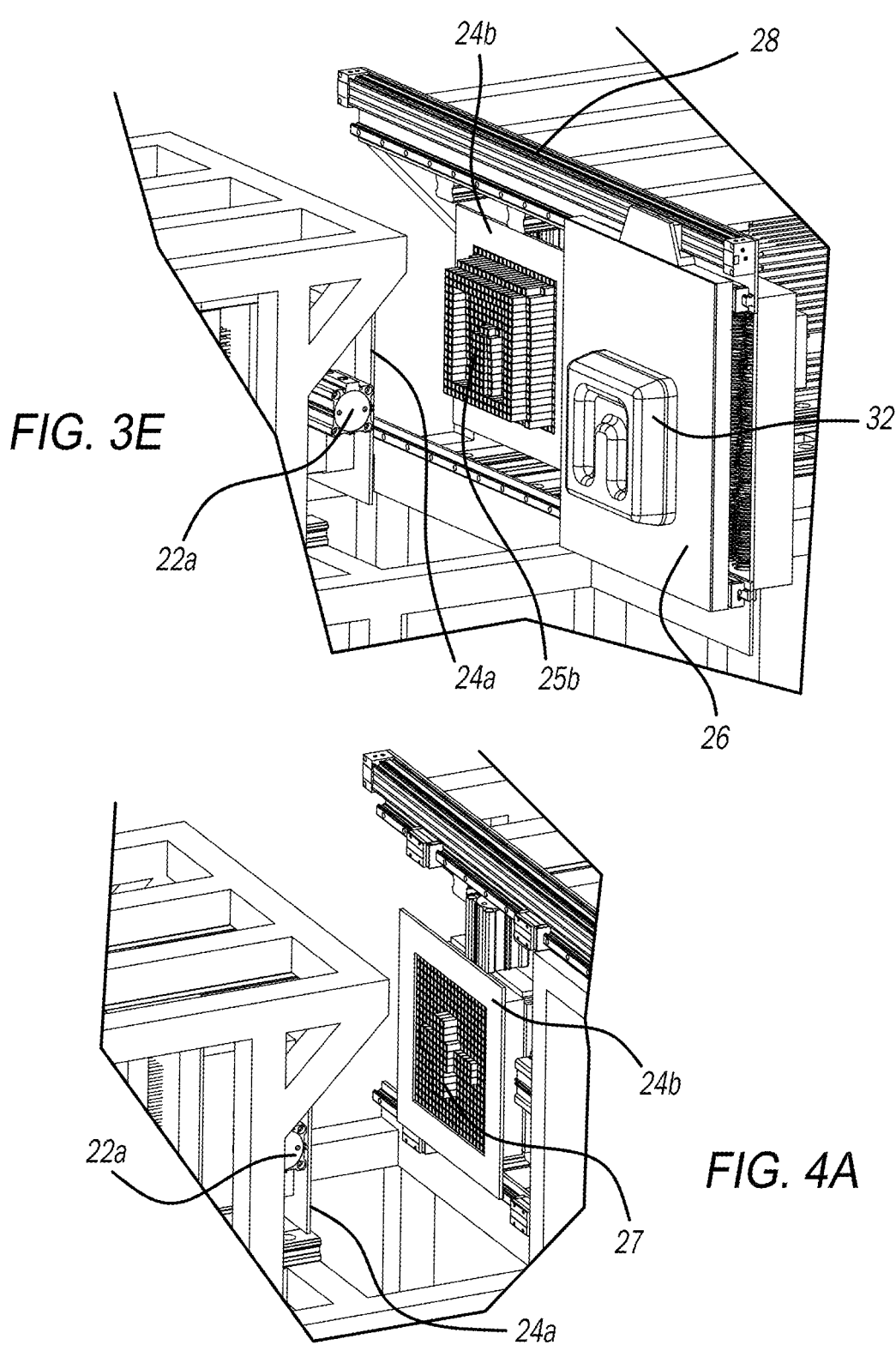
FIGS. 4A-4F shows another sequence of steps of forming a component with the thermoforming assembly shown in FIG. 1 in accordance with the principles of the present disclosure.

Referring further to FIGS. 3A-3B, a sequence of steps are shown to form a product: the individual sections of each mold 24a, 24b are in an initial state (FIG. 3A); under the direction of the controller 15, the set of actuators 12a, 12b associated with each mold 24a, 24b moves the sections to define a desired shape, such as, for example, a shape 25b, and locking mechanisms, such as, locks 22a, 22b lock the sections in position (FIG. 3B); the rail 28 places the blank 26 between the molds 24a, 24b (FIG. 3C); the blank 26 is heated with a heater to a desired temperature, and the hydraulic cylinders 16a, 16b move the molds 24a, 24b towards each other such that the molds 24a, 24b press against the blank 26 to form a product 32 with a shape corresponding to the shape 25b (FIG. 3D); and (e) the hydraulic cylinders 16a, 16b move the molds 24a, 24b away from each other, and the rail 28 moves the blank 26 along with the product 32 away from the molds 24a, 24b (FIG. 3E).

Hence, the present disclosure describes a thermoforming assembly 10 that can change the form of the molds 24a, 24b by moving individual sections with the actuators 12a, 12b. After the individual sections the molds 24a, 24b define a desired shape, the individual sections are locked in place, and the molds are pressed against a heated blank 26 to form a product 32.

Figures 4B, 4C:
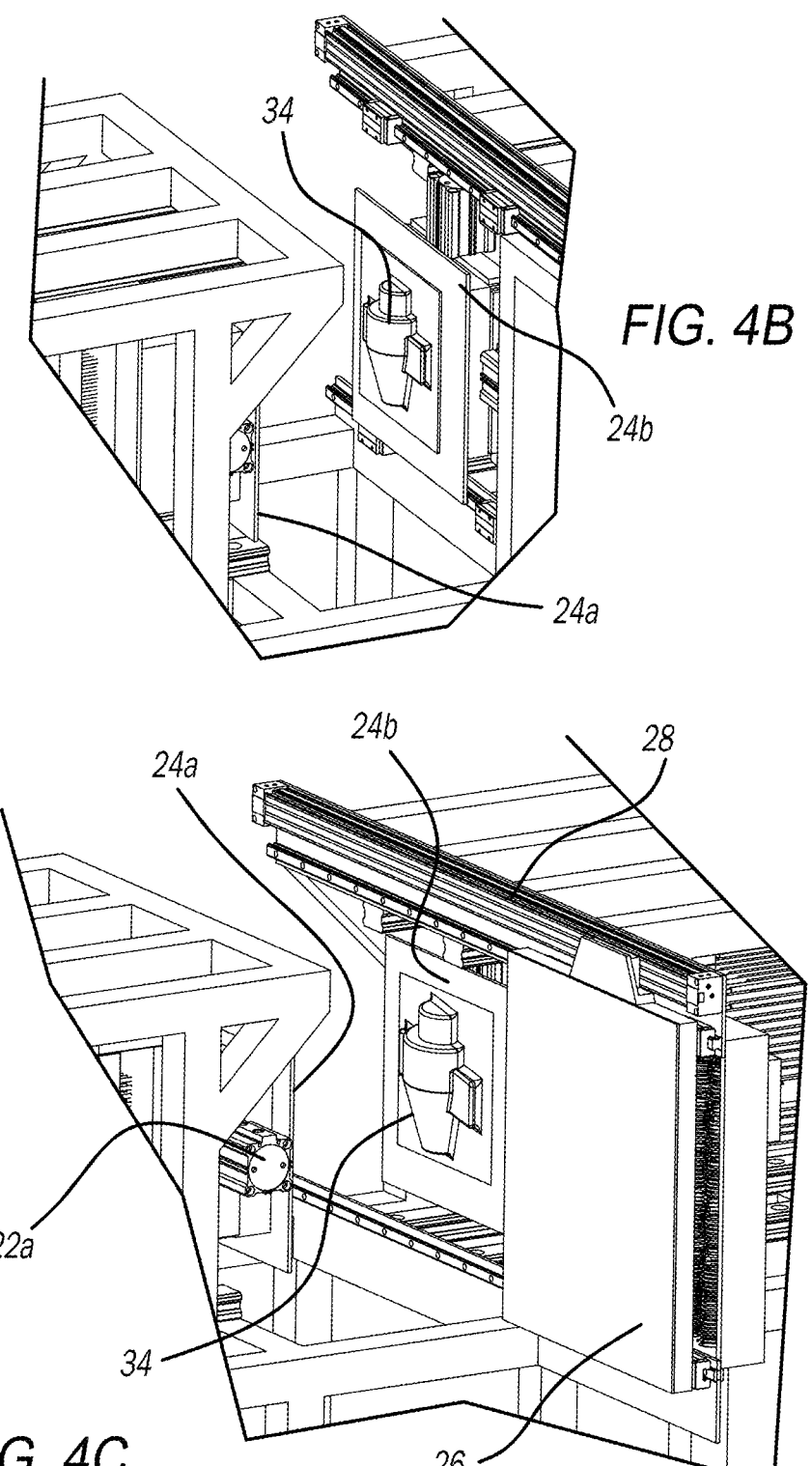
Figures 4D, 4E:
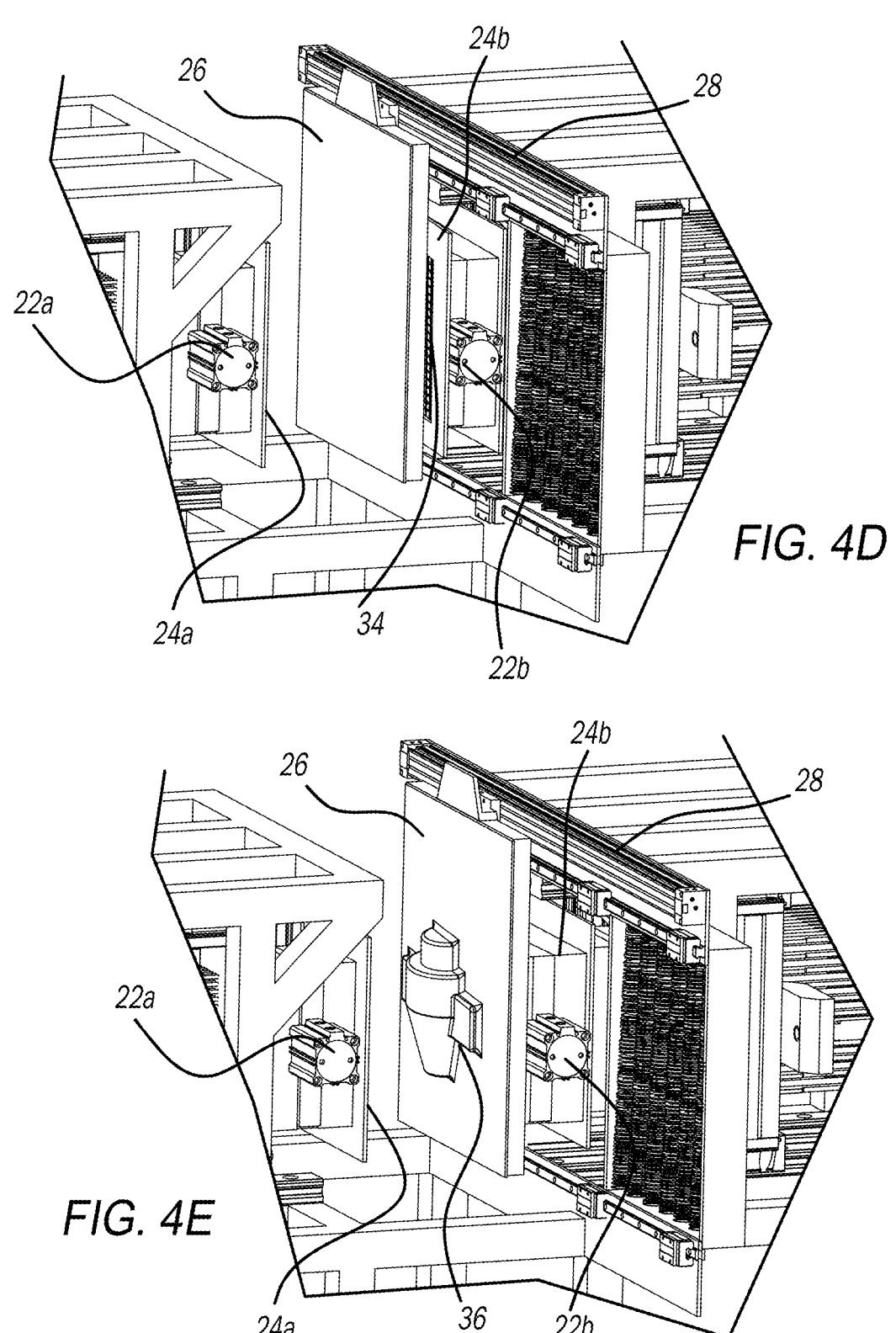
Figure 4F:
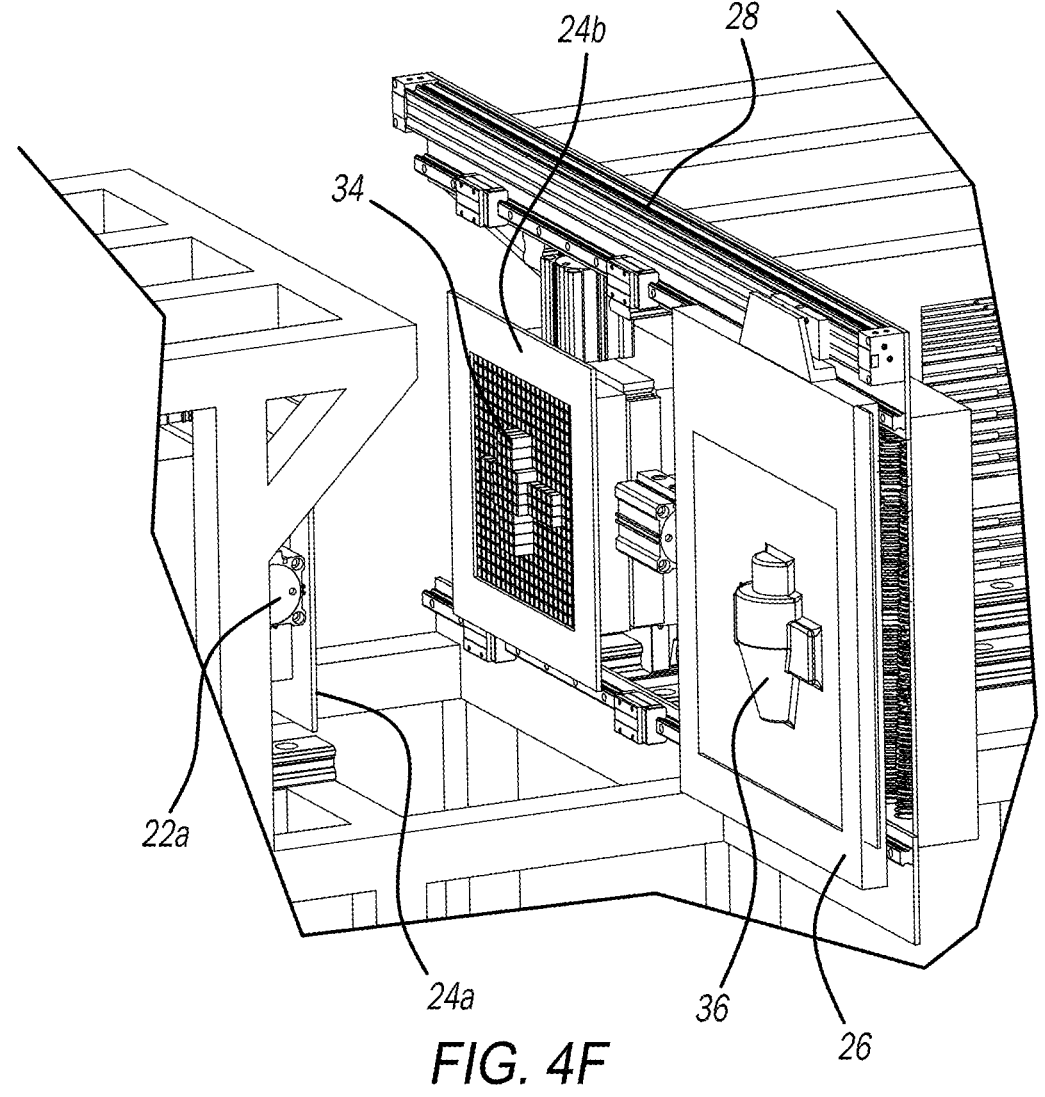

Turning now to FIGS. 4A-4F, another implementation of the thermoforming assembly 10 is shown, which illustrates a sequence of steps that implements 3D printing to form a product: under the direction of the controller 15, the individual sections of each mold 24a, 24b are placed in an initial state to define a working surface setup 27 (FIG. 4A); a 3D printed surface 34 is positioned between the molds 24a, 24b over the working surface setup 27 (FIG. 4B); the rail 28 places the blank 26 between the molds 24a, 24b (FIG. 4C); the blank 26 is heated by a heater to a desired temperature, and the hydraulic cylinders 16a, 16b move the molds 24a, 24b towards each other (FIG. 4D); the molds 24a, 24b press the blank 26 against the 3D printed surface 34 to form a product 36 corresponding to the shape of the 3D printed surface 34 (FIG. 4E); and the hydraulic cylinders 16a, 16b move the molds 24a, 24b away from each other, and the rail 28 moves the blank 26 along with the product 36 away from the molds 24a, 24b (FIG. 4F). Hence, for complex shapes, the thermoforming assembly 10 can be utilized as a mold holder of a 3D printed surface to form a product 36. Such an arrangement reduces down-time typically associated with tooling changes.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A thermoforming apparatus comprising:
a pair of molds, one mold of the pair of molds including a plurality of sections, each section being independently movable;
a set of actuators, each actuator being configured to move each section of the plurality of sections to specific positions, the pair of molds being configured to press against a blank to form a product with a shape corresponding to the specific positions of the plurality of sections; and
a lock mechanism that secures each section at the specific positions.

2. The apparatus of claim 1 further comprising a pneumatic actuator that moves the blank into a specified position.

3. The apparatus of claim 2, wherein the pneumatic actuator moves the blank after the product is formed.

4. The apparatus of claim 1 further comprising a heater that heats the blank prior to forming the product.

5. The apparatus of claim 1, wherein the set of actuators comprise a set of stepper motors, each stepper motor being attached to a respective screw to convert rotational movement to longitudinal movement.

6. The apparatus of claim 1, wherein each section is movable to a new position to form a second product.

7. The apparatus of claim 1 further comprising a controller that provides instructions to the set of actuators and a computer that transmits instructions to the controller through an interface to position the set of actuators based on a computer aided design (CAD) file loaded in the computer.

8. The apparatus of claim 7, wherein the controller is a programable logic controller (PLC).

9. A thermoforming assembly comprising:
a first thermoforming apparatus and a second thermoforming apparatus, each thermoforming apparatus comprising:
a mold with a plurality of sections, each section being independently movable; and
a set of actuators, each actuator being configured to move each section of the plurality of sections to specific positions, the mold being configured to press against a blank to form a product with a shape corresponding to the specific positions of the plurality of sections,
wherein the mold of the first thermoforming apparatus is pressed against a first side of the blank, and the mold of the second thermoforming apparatus is pressed against a second side of the blank.

10. The assembly of claim 9 further comprising a pneumatic actuator that moves the blank into a specified position.

11. The assembly of claim 10, wherein the pneumatic actuator moves the blank after the product is formed.

12. The assembly of claim 9 further comprising a heater that heats the blank prior to forming the product.

13. The assembly of claim 9, wherein the set of actuators is a set of stepper motors, each stepper motor being attached to a screw to transmit rotational movement to longitudinal movement.

14. The assembly of claim 9 further comprising a lock mechanism that secures each section at the specific positions.

15. The assembly of claim 9 further comprising a controller that provides instructions to the set of actuators and a computer that transmits instructions to the controller through an interface to position the set of actuators based on a computer aided design (CAD) file loaded in the computer.

* * * * *